(12) United States Patent
Kim et al.

(10) Patent No.: US 9,874,779 B2
(45) Date of Patent: Jan. 23, 2018

(54) POLARIZER AND METHOD OF MANUFACTURING THE SAME AND LIQUID CRYSTAL DISPLAY DEVICE USING THE SAME

(71) Applicant: LG Display Co., Ltd., Seoul (KR)

(72) Inventors: Chang Soo Kim, Paju-si (KR); Chae Kyung Lim, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 63 days.

(21) Appl. No.: 14/843,788

(22) Filed: Sep. 2, 2015

(65) Prior Publication Data
US 2016/0070139 A1  Mar. 10, 2016

(30) Foreign Application Priority Data

Sep. 5, 2014  (KR) .................. 10-2014-0118457

(51) Int. Cl.
| | | |
|---|---|---|
| G02F 1/1335 | (2006.01) | |
| B29D 11/00 | (2006.01) | |
| G02F 1/017 | (2006.01) | |
| B29K 29/00 | (2006.01) | |

(52) U.S. Cl.
CPC .... G02F 1/133528 (2013.01); B29D 11/0073 (2013.01); B29D 11/00644 (2013.01); B29D 11/00865 (2013.01); B29K 2029/04 (2013.01); *G02F 2001/01791* (2013.01)

(58) Field of Classification Search
CPC ........ G02F 1/133528; B29D 11/00644; B29D 11/0073; B29D 11/00865
See application file for complete search history.

(56) References Cited

U.S. PATENT DOCUMENTS

2011/0216271 A1* 9/2011 Suzuki ............... G02F 1/13362
349/71

\* cited by examiner

*Primary Examiner* — Anne Hines
(74) *Attorney, Agent, or Firm* — Birch, Stewart, Kolasch & Birch, LLP

(57) ABSTRACT

A liquid crystal display device and a method of manufacturing the same are discussed. The liquid crystal display device can include a backlight unit; and a liquid crystal panel having a lower polarizer arranged on the backlight unit, wherein the lower polarizer includes a polarizing layer having a light axis for polarized light and a wavelength conversion material provided between the polarizing layer and the backlight unit.

13 Claims, 4 Drawing Sheets

POLARIZER AND METHOD OF MANUFACTURING THE SAME AND LIQUID CRYSTAL DISPLAY DEVICE USING THE SAME

CROSS REFERENCE TO RELATED APPLICATIONS

This application claims the priority benefit of the Korean Patent Application No. 10-2014-0118457 filed on Sep. 5, 2014, which is hereby incorporated by reference for all purposes as if fully set forth herein.

BACKGROUND OF THE INVENTION

Field of the Invention

The present invention relates to a liquid crystal display device, and more particularly, to a liquid crystal display device having an improved light efficiency, a polarizer used in the liquid crystal display device, and a method of manufacturing the polarizer.

Discussion of the Related Art

A liquid crystal display (LCD) device is advantageous in that it enables low power consumption owing to a low operation voltage and portability. Due to these advantages, the LCD device is widely used in various fields, for example, notebook computers, monitors, mobile terminal, televisions, spacecrafts, aircrafts, etc.

The LCD device includes a lower substrate, an upper substrate, and a liquid crystal layer between the lower and upper substrates. As an electric field is applied to the LCD device, liquid crystal molecules of the liquid crystal layer are aligned so that a light transmittance is controlled, and thus an image is displayed on the LCD device.

Hereinafter, a related art LCD device will be described with reference to FIG. 1.

FIG. 1 is a cross-sectional view illustrating the related art LCD device. As shown in FIG. 1, the related art LCD device includes a backlight unit 10 and a liquid crystal panel 20.

The backlight unit 10 supplies light to the liquid crystal panel 20. Since the LCD device is not a self-emissive device, the LCD device is provided with the backlight unit 10 as a light source for supplying light toward a lower portion of the LCD device.

The backlight unit 10 includes a light emitting device 12, a light guide plate 14, an optical sheet 16, and a reflective plate 18. The light emitting device 12 is a device for emitting light, and a light emitting diode (LED) has been used as the light emitting device 12.

The light guide plate 14 is arranged to face the light emitting device 12. The light guide plate 14 changes a moving path of light to allow the light emitted from the light emitting device 12 to move toward the liquid crystal panel 20.

The optical sheet 16 is formed above the light guide plate 14. The optical sheet 16 allows light emitted through an upper surface of the light guide plate 14 to uniformly enter the liquid crystal panel 20. This optical sheet 16 includes a combination of a diffusion sheet and a prism sheet.

The reflective plate 18 is formed below the light guide plate 14. The reflective plate 18 reflects light, which is emitted toward a lower portion of the light guide plate 14, toward an upper portion of the light guide plate 14, whereby light efficiency can be improved.

The liquid crystal panel 20 includes an upper substrate 21, a lower substrate 22, a sealant 23, a liquid crystal layer 24, an upper polarizer 25 and a lower polarizer 26. The sealant 23 is formed at a corner of the upper substrate 21 and the lower substrate 22 to bond the upper and lower substrates 21 and 22 to each other.

The liquid crystal layer 24 is formed in an area between the upper substrate 21 and the lower substrate 22, which are bonded to each other by the sealant 23. Although not shown, a pixel electrode and a common electrode are formed in at least one of the upper substrate 21 and the lower substrate 22, whereby an alignment direction of the liquid crystal layer 24 is changed by an electric field between the pixel electrode and the common electrode.

The upper polarizer 25 is formed on the upper substrate 21, and the lower polarizer 26 is formed below the lower substrate 22. The lower polarizer 26 polarizes light toward a predetermined light axis. Therefore, the light emitted from the backlight unit 10 is polarized toward the predetermined light axis while passing through the lower polarizer 26 towards the liquid crystal layer 24.

The upper polarizer 25 includes a light axis perpendicular to the lower polarizer 26. Therefore, the light polarized while passing through the lower polarizer 26 becomes a black state by failing to pass through the upper polarizer 25 if its phase is not delayed while passing though the liquid crystal layer 24, whereas the light becomes a white state by passing through the upper polarizer 25 if its phase is delayed while passing though the liquid crystal layer 24. The phase delay of the polarized light may be controlled through the alignment state of the liquid crystal layer 24.

In the related art LCD device described as above, the light emitted from the light emitting device 12 passes through all of the light guide plate 14, the optical sheet 16, the lower polarizer 26, the lower substrate 22, the liquid crystal layer 24, the upper substrate 21 and the upper polarizer 25. In this case, much light is lost while the light passes through these layers, whereby a problem occurs in that light efficiency is deteriorated.

SUMMARY OF THE INVENTION

Accordingly, the present invention is directed to a polarizer, a method of manufacturing the same, and a liquid crystal display device using the same, which substantially obviate one or more problems due to limitations and disadvantages of the related art.

An advantage of the present invention is to provide a liquid crystal display device with an improved light efficiency and a method of manufacturing the liquid crystal display device.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a liquid crystal display device according to an embodiment includes a backlight unit; and a liquid crystal panel having a lower polarizer arranged on the backlight unit, wherein the lower polarizer includes a polarizing layer having a light axis for polarized light and a wavelength conversion material provided between the polarizing layer and the backlight unit.

In another aspect of the present invention, there are provided a polarizer including a polarizing layer having a light axis for polarized light; and a wavelength conversion material for converting a wavelength of light before the light enters the polarizing layer, and a method of manufacturing the same.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Figure 1:
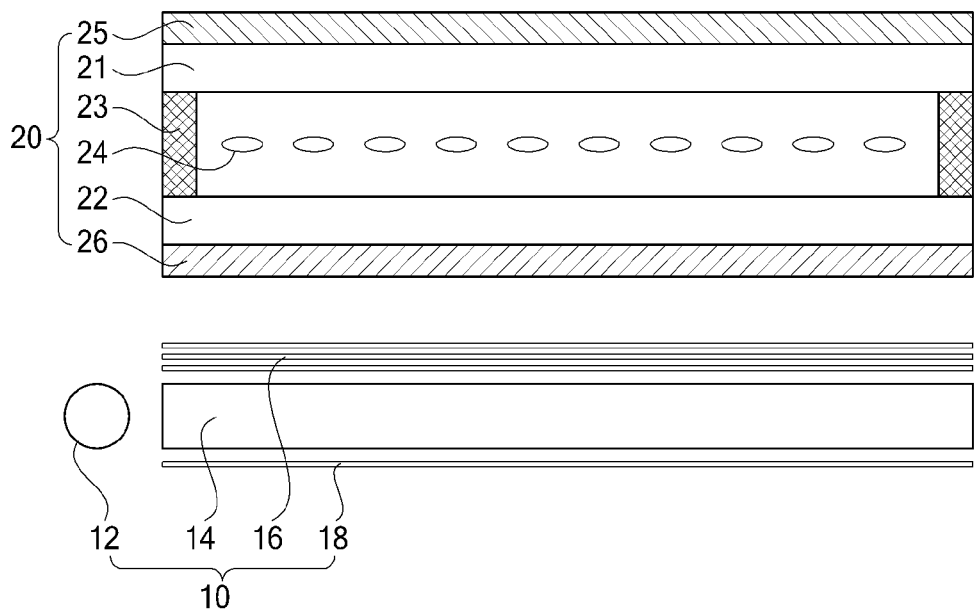
FIG. 1 is a cross-sectional view illustrating a related art liquid crystal display device.

Reference will now be made in detail to the various embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through the following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Moreover, one or more features from each embodiment may be applied to any other embodiment of the present invention.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the known function or configuration is determined to unnecessarily obscure the aspect(s) of the present invention, the detailed description will be omitted. In a case where 'comprise', 'have', and 'include' described in the present specification are used, one or more other parts/elements/components may be added unless 'only~' is used. The terms of a singular form may include plural forms unless referred to the contrary.

In construing an element, the element is construed as including an error range although there is no explicit description.

In description of embodiments of the present invention, when a structure (for example, an electrode, a line, a wiring, a layer, a contact, etc.) is described as being formed at an upper portion/lower portion of another structure or on/under the other structure, this description should be construed as including a case where the structures contact each other and moreover, a case where a third structure or multiple structures are disposed therebetween.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, the preferred embodiments of the present invention will be described in detail with reference to the accompanying drawings.

Figure 2:
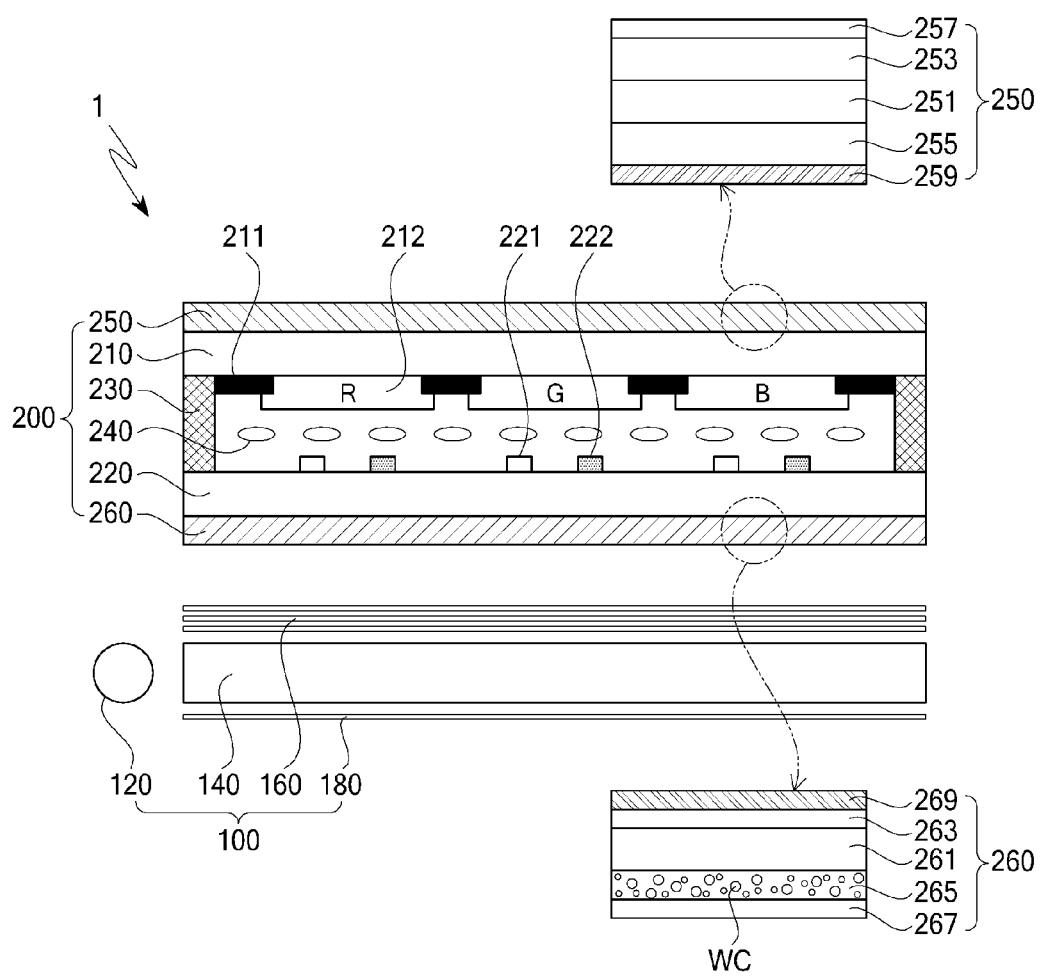
FIG. 2 is a cross-sectional view illustrating a liquid crystal display device according to one embodiment of the present invention.

FIG. 2 is a cross-sectional view illustrating a liquid crystal display device 1 according to one embodiment of the present invention.

As shown in FIG. 2, the liquid crystal display device 1 according to one embodiment of the present invention includes a backlight unit 100 and a liquid crystal panel 200. All the components of the liquid crystal display devices of the present invention are operatively coupled and configured.

The backlight unit 100 is arranged below the liquid crystal panel 200 to supply light to the liquid crystal panel 200, but may be arranged at a different location.

The backlight unit 100 may be categorized into a direct type backlight unit and an edge type backlight unit, wherein the direct type backlight unit transfers light emitted from a light source toward the liquid crystal panel 200 by arranging the light source on the entire lower surface of the liquid crystal panel 200, and the edge type backlight unit transfers light emitted from a light source toward the liquid crystal panel 200 through a light guide plate by arranging the light source at one side below the liquid crystal panel 200. Either the direct type backlight unit or the edge type backlight unit may be applied to one or more embodiments of the present invention. Although the edge type backlight unit 100 is shown, the edge type backlight unit may be more favorable than the direct type backlight unit to minimize a thickness of the liquid crystal display device.

The backlight unit 100 includes a light emitting device 120, a light guide plate 140, an optical sheet 160, and a reflective plate 180.

The light emitting device 120 is a device for emitting light, and is arranged at one side below the liquid crystal panel 200. Although the light emitting device 120 may emit white light, the light emitting device 120 may emit blue light without being limited to emit the white light.

The light emitting device 120 may be made of one or more light emitting diodes (LEDs). In this case, the light emitting device 120 may include a blue emission chip to emit the blue light, or may include a blue emission chip and a yellow fluorescent material to emit the white light. Alternatively, the light emitting device 120 may include a blue emission chip, a red fluorescent material, and a green fluorescent material to emit the white light. The light emitting device 120 may be made of a cold cathode fluorescent lamp (CCFL).

The light guide plate 140 is arranged such that its one side faces the light emitting device 120. The light guide plate 140 changes a moving path of light to move the light emitted from the light emitting device 120 toward the liquid crystal panel 200. In order to change the moving path of the light, the light guide plate 140 may include a concave pattern or a convex pattern thereon and/or therebelow. Various modifications known in the art may be made or used in the light guide plate 140.

The optical sheet 160 is formed above the light guide plate 140. The optical sheet 160 allows light emitted through an upper surface of the light guide plate 140 to uniformly enter the liquid crystal panel 200. This optical sheet 160 may include, but is not limited to, a combination of diffusion sheet(s) and prism sheet(s). For example, the optical sheet 160 may include a dual brightness enhancement film (DBEF).

The reflective plate 180 is formed below the light guide plate 140. The reflective plate 180 reflects light, which is emitted toward a lower portion of the light guide plate 140, toward an upper portion of the light guide plate 140, whereby light efficiency is improved.

The backlight unit 100 may further include a printed circuit board (PCB) for supplying power to the light emitting device 120. Also, the backlight unit 100 may further include a cover bottom for receiving the light emitting device 120, the light guide plate 140 and the reflective plate 180. Also, the backlight unit 100 may further include a guide frame for supporting the optical sheet 160 and the liquid crystal panel 200. Various shapes known in the art may be applied to the printed circuit board (PCB), the cover bottom, and the guide frame.

The liquid crystal panel 200 is preferably arranged above the backlight unit 100, and includes an upper substrate 210, a lower substrate 220, a sealant 230, a liquid crystal layer 240, an upper polarizer 250 and a lower polarizer 260.

The upper substrate 210 includes a light shielding layer 211 and a color filter layer 212 on its lower surface facing the lower substrate 220. The light shielding layer 211 is formed in an area other than a pixel area to shield light from leaking toward the area other than the pixel area. The color filter layer 212 may be formed in the pixel area to obtain a color image of the liquid crystal display device. The color filter layer 212 can include a red (R) color filter, a green (G) color filter, and a blue (B) color filter, or other variations thereof.

The lower substrate 220 includes a pixel electrode 221 and a common electrode 222 on its upper surface facing the upper substrate 210.

The pixel electrode 221 and the common electrode 222 are formed in their respective pixel areas to form an electric field therebetween. Therefore, an arrangement state of the liquid crystal layer 240 is controlled by the electric field between the pixel electrode 221 and the common electrode 222. Further, a thin film transistor for switching a voltage supply to the pixel electrode 221 is formed in each pixel area on the lower substrate 220.

Various modifications may be made in a detailed configuration of the upper substrate 210 and the lower substrate 220 in accordance with a driving mode of the liquid crystal display device. For example, if the liquid crystal display device according to the present invention is a twisted nematic (TN) mode, the common electrode 222 can be formed on the upper substrate 210 and the pixel electrode 221 can be formed on the lower substrate 220, whereby a vertical electric field is formed between the common electrode 222 and the pixel electrode 221. In another example, if the liquid crystal display device according to the present invention is an in plane switching (IPS) mode or a fringe field switching (FFS) mode, the pixel electrode 221 and the common electrode 222 can both be formed on the lower substrate 220, whereby a horizontal electric field is formed between the pixel electrode 221 and the common electrode 222.

The sealant 230 is formed at a corner of the upper substrate 210 and the lower substrate 220 (or at different location(s)) to bond the substrates 210 and 220 to each other.

The liquid crystal layer 240 is formed in an area between the upper substrate 210 and the lower substrate 220, which are bonded to each other by the sealant 230. Further, a spacer for maintaining a cell gap between the upper substrate 210 and the lower substrate 220 may additionally be formed between the upper substrate 210 and the lower substrate 220.

The upper polarizer 250 is formed on the upper substrate 210. As will be aware of it from an enlarged portion of FIG. 2, the upper polarizer 250 includes a first polarizing layer 251, a first upper coating layer 253, a first lower coating layer 255, a first protection layer 257, and a first adhesive layer 259.

The first polarizing layer 251 is to give polarizing characteristics of the upper polarizer 250. Therefore, the first polarizing layer 251 is provided with a predetermined light axis to polarize light which passes therethrough. The first polarizing layer 251 may be formed by exhaustion (or reaction) of iodine (I) and boric acid (B) to polyvinyl alcohol (PVA). In more detail, the first polarizing layer 251 may be obtained by an elongation process after exhaustion of iodine (I) and boric acid (B) to polyvinyl alcohol (PVA).

The first upper coating layer 253 is formed on the first polarizing layer 251 to protect the upper surface of the first polarizing layer 251. Particularly, surface treatment may be added to the surface of the first upper coating layer 253. For example, anti-reflective coating may be added to the surface of the first upper coating layer 253. The first upper coating layer 253 may be made of Triacetyl Cellulose (TAC).

The first lower coating layer 255 is formed below the first polarizing layer 251 to protect the lower surface of the first polarizing layer 251. The first lower coating layer 255 may be made of Triacetyl Cellulose (TAC).

The first protection layer 257 is formed on the first upper coating layer 253 to protect the surface of the upper polarizer 250. For example, the first protection layer 257 prevents a scratch from being generated on the upper polarizer 250. The first protection layer 257 may be made of one or more various protective films known in the art.

The first adhesive layer 259 is formed below the first lower coating layer 255. The first adhesive layer 259 allows the upper polarizer 250 to adhere to the upper surface of the upper substrate 210. The first adhesive layer 259 may be made of one or more various adhesive materials known in the art.

The lower polarizer 260 is formed below the lower substrate 220. As shown in another enlarged portion of FIG. 2, the lower polarizer 260 includes a second polarizing layer 261, a second upper coating layer 263, a second lower coating layer 265, a second protection layer 267, and a second adhesive layer 269.

The second polarizing layer 261 is to give polarizing characteristics of the lower polarizer 260. Therefore, the second polarizing layer 261 is provided to have a predetermined light axis to polarize light which passes therethrough. The light axis of the second polarizing layer 261 may be, but is not limited to, perpendicular to the light axis of the first polarizing layer 251. The second polarizing layer 261 may be formed by exhaustion (or reaction) of iodine (I) and boric acid (B) to polyvinyl alcohol (PVA), like the first polarizing layer 251.

The second upper coating layer 263 is formed on the second polarizing layer 261 to protect the upper surface of the second polarizing layer 261. The second upper coating layer 263 may be made of Triacetyl Cellulose (TAC).

The second lower coating layer 265 is formed below the second polarizing layer 261 to protect the lower surface of the second polarizing layer 261 and convert a wavelength of light emitted from the backlight unit 100, thereby improving the light efficiency of the liquid crystal display device. The second lower coating layer 265 may include Triacetyl Cellulose (TAC) as a base and include a wavelength conversion material (WC) in the base.

According to the embodiments of the present invention, the wavelength conversion material (WC) improves light efficiency of the liquid crystal display device by converting a wavelength of light emitted from the backlight unit 100. In more detail, if the backlight unit 100 emits white light, the emitted white light has the greatest light intensity in a blue wavelength range, and the light intensity of a green wavelength range and the light intensity of a red wavelength range are smaller than that of the blue wavelength range. Therefore, if the white light which has light intensity that varies depending on wavelength ranges enters the liquid crystal panel 200, the efficiency of light passing through the green (G) and red (R) color filter layers 212 is more deteriorated than the efficiency of light passing through the blue (B) color filter layer 212.

In one embodiment of the present invention, as the second lower coating layer 265 includes the wavelength conversion material (WC), the light of the blue wavelength range is partially converted to the light of the green wavelength range and the light of the red wavelength range by the wavelength conversion material (WC), whereby uniform light intensity is generated in the entire wavelength range. As a result, the problem in the related art where the efficiency of light passing through the green (G) and red (R) color filter layers 212 is deteriorated, can be minimized or solved.

Therefore, according to one or more embodiments of the present invention, the wavelength conversion material (WC) is made of a mixture of a material for converting a light of the blue wavelength range to a light of the green wavelength range and a material for converting a light of the blue wavelength range to a light of the red wavelength range. For example, the wavelength conversion material (WC) may be made of a mixture of (a) and (b) materials, where the (a) material is for converting a light of a blue wavelength of which peak wavelength range is 400 nm to 450 nm, to a light of a red wavelength of which peak wavelength range is 600 nm to 640 nm, and the (b) material is for converting a light of a blue wavelength of which peak wavelength range is 400 nm to 455 nm, to a light of a green wavelength of which peak wavelength range is 500 nm to 570 nm. However, the wavelength conversion material (WC) may be made of either a material for converting a light of a blue wavelength to a light of a green wavelength or a material for converting a light of a blue wavelength to a light of a red wavelength without limitation to the above example. Obviously other variations are possible for the wavelength conversion material (WC).

The wavelength conversion material (WC) may be made of a quantum dot. The quantum dot is characterized in that it emits light as a semiconductor material having a crystalline structure of several tens of nanometers or less. Particularly, since an energy level of the quantum dot is varied depending on its size, the size of the quantum dot may simply be varied to control a band gap. For instance, since the quantum dot may control an emission wavelength through size control, the quantum dot may be used usefully as the wavelength conversion material (WC). In another example, the wavelength conversion material (WC) may be made of fluorescent dyes without limitation to the quantum dot.

According to one embodiment of the present invention, since the wavelength conversion material (WC) for converting a light of a blue wavelength to a light of a green or red wavelength is included in the second lower coating layer 265, it does not matter whether the backlight unit 100 emits blue light not white light. That is, if the backlight unit 100 emits blue light, the emitted blue light may partially be converted to the light of green and/or red wavelength(s) by the wavelength conversion material (WC) included in the second lower coating layer 265, whereby there is no problem in displaying a color image.

Meanwhile, it is preferable that the wavelength conversion material (WC) is formed at a position before the light emitted from the backlight unit 100 is polarized. If the wavelength of the light emitted from the backlight unit 100 is converted by the wavelength conversion material (WC) after the light is polarized, a desired effect of improving light efficiency may not be obtained. Therefore, the wavelength conversion material (WC) is preferably formed between the backlight unit 100 and the second polarizing layer 261. In this respect, in one embodiment of the present invention, the wavelength conversion material (WC) is included in the second lower coating layer 265 formed below the second polarizing layer 261.

The second protection layer 267 is formed below the second lower coating layer 265 to protect the surface of the lower polarizer 260. The second protection layer 267 may be made of one or more various protective films known in the art.

The second adhesive layer 269 is formed on the second upper coating layer 263. The second adhesive layer 269 may allow the lower polarizer 260 to adhere to the lower surface of the lower substrate 220. The second adhesive layer 269 may be made of one or more various adhesive materials known in the art.

Figure 3:
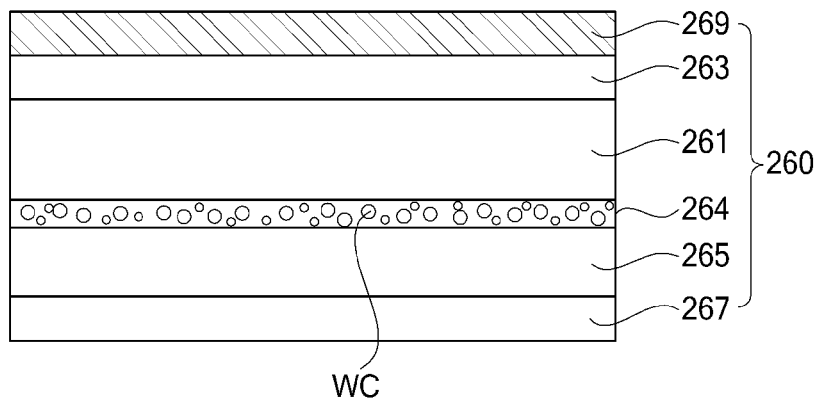
FIG. 3 is a cross-sectional view illustrating a lower polarizer according to another embodiment of the present invention.

FIG. 3 is a cross-sectional view illustrating a lower polarizer 260 according to another embodiment of the present invention.

As shown in FIG. 3, the lower polarizer 260 according to another embodiment of the present invention includes a second polarizing layer 261, a second upper coating layer 263, a wavelength conversion layer 264, a second lower coating layer 265, a second protection layer 267, and a second adhesive layer 269.

The lower polarizer 260 of FIG. 3 is mainly different from that shown in FIG. 2 in that the wavelength conversion layer 264 is separately formed instead of having the wavelength conversion material included in the second lower coating layer 265.

Since the second polarizing layer 261, the second upper coating layer 263, the second protection layer 267, and the second adhesive layer 269 in the lower polarizer 260 of FIG. 3 are the same as those described as above, their description will be omitted or minimized. Similarly, all other components of the liquid crystal display device of FIG. 2 can be applicable or included in a liquid crystal display device having the lower polarizer of FIG. 3.

The wavelength conversion layer 264 is formed below the second polarizing layer 261, more specifically between the second polarizing layer 261 and the second lower coating layer 265. The wavelength conversion layer 264 includes a wavelength conversion material (WC). Since the wavelength conversion material (WC) included in the wavelength conversion layer 262 is the same as that described as above for FIG. 2, its description will be omitted or minimized. The wavelength conversion layer 264 may include a transparent polymer material as a base, and the wavelength conversion material (WC) included in the base.

The second lower coating layer 265 is formed below the wavelength conversion layer 264, more specifically between the wavelength conversion layer 264 and the second protection layer 267. The second lower coating layer 265 may be made of Triacetyl Cellulose (TAC).

Figure 4:
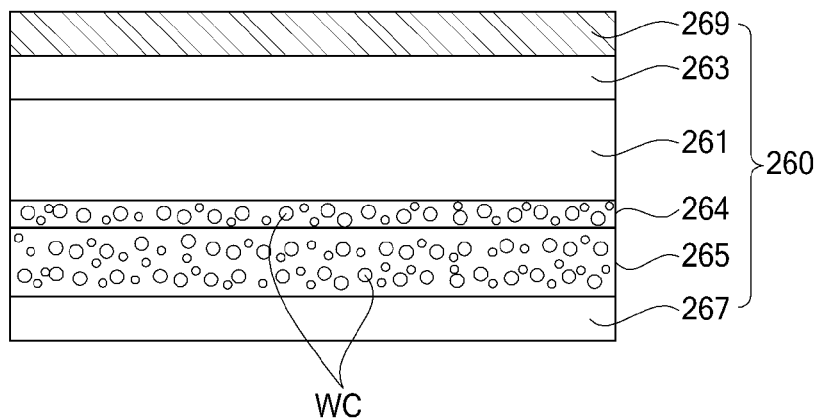
FIG. 4 is a cross-sectional view illustrating a lower polarizer according to still another embodiment of the present invention.

FIG. 4 is a cross-sectional view illustrating a lower polarizer 260 according to still another embodiment of the present invention.

The lower polarizer 260 of FIG. 4 is mainly different from that shown in FIG. 2 in that a separate wavelength conversion layer 264 is additionally formed between the second polarizing layer 261 and the second lower coating layer 265. Here, all other components of the liquid crystal display device of FIG. 2 can be applicable or included in a liquid crystal display device having the lower polarizer of FIG. 4.

In the lower polarizer 260 of FIG. 4, the wavelength conversion material (WC) is included in each of the second lower coating layer 265 and the wavelength conversion layer 264. At this time, the wavelength conversion material (WC) included in the second lower coating layer 265 may be the same as or different from the wavelength conversion material (WC) included in the wavelength conversion layer 264.

For example, each of the wavelength conversion materials (WC) included in the second lower coating layer 265 and the wavelength conversion layer 264 may be made of a mixture of (a) a material for converting a light of a blue wavelength range to a light of a green wavelength range and (b) a material for converting a light of the blue wavelength range to a light of a red wavelength range. Alternatively, the wavelength conversion material (WC) included in the second lower coating layer 265 may be made of solely a material for converting a light of the blue wavelength range to a light of the green wavelength range, while the wavelength conversion material (WC) included in the wavelength conversion layer 264 may be made of solely a material for converting a light of the blue wavelength range to a light of the red wavelength range. Alternatively, the wavelength conversion material (WC) included in the second lower coating layer 265 may be made of solely a material for converting a light of the blue wavelength range to a light of the red wavelength range, while the wavelength conversion material (WC) included in the wavelength conversion layer 264 may be made of solely a material for converting a light of the blue wavelength range to a light of the green wavelength range. Still as another variation, the wavelength conversion materials (WC) included in one of the second lower coating layer 265 and the wavelength conversion layer 264 may be made of a mixture of (a) a material for converting a light of a blue wavelength range to a light of a green wavelength range and (b) a material for converting a light of the blue wavelength range to a light of a red wavelength range, while the wavelength conversion materials (WC) included in the other one of the second lower coating layer 265 and the wavelength conversion layer 264 may be made of solely a material for converting a light of the blue wavelength range to a light of the green or red wavelength range.

Figure 5:
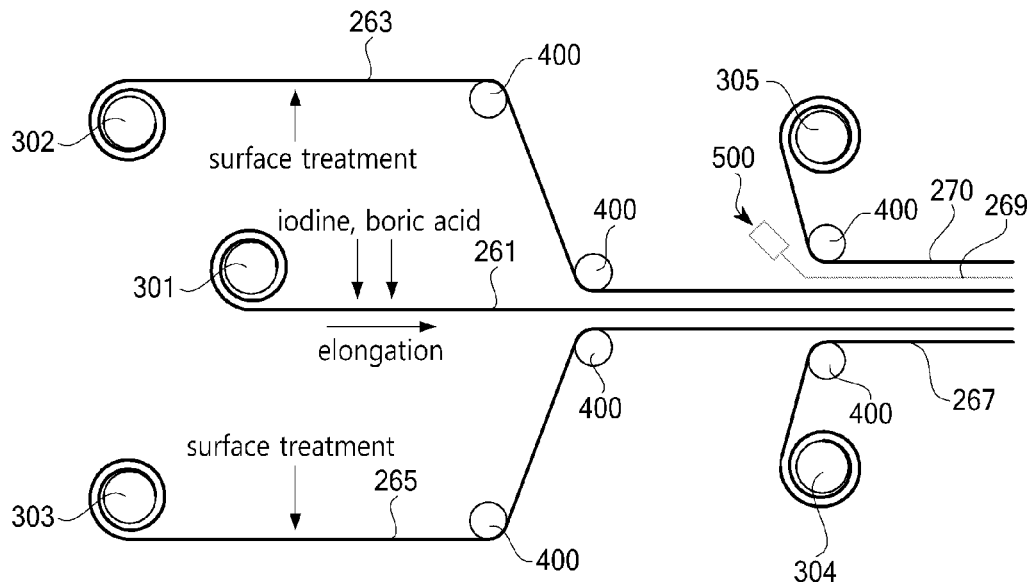
FIG. 5 is a schematic view illustrating a manufacturing process of a lower polarizer according to one embodiment of the present invention.

FIG. 5 is a schematic view illustrating a manufacturing process of a lower polarizer according to one embodiment of the present invention, and relates to a manufacturing process of the aforementioned lower polarizer shown in FIG. 2 as an example.

As shown in FIG. 5, polyvinyl alcohol (PVA) for the second polarizing layer 261 is wound in a first winding roll 301, and the second polarizing layer 261 is formed by exhaustion/reaction of iodine (I) and boric acid (B) and then elongation thereof while the polyvinyl alcohol (PV) wound in the first winding roll 301 is being unwound.

Triacetyl Cellulose (TAC) for the second upper coating layer 263 is wound in a second winding roll 302 arranged at one side of the first winding roll 301, for example, above the first winding roll 301. The Triacetyl Cellulose (TAC) for the second upper coating layer 263 is guided to the upper surface of the second polarizing layer 261 by a plurality of guide rollers 400, whereby the second upper coating layer 263 is formed. At this time, surface treatment is performed for the lower surface of the Triacetyl Cellulose (TAC) for the second upper coating layer 263, whereby an adhesive force between the second upper coating layer 263 and the second polarizing layer 261 may be improved. The surface treatment may be performed by sodium hydroxide (NaOH) treatment and water washing treatment.

Triacetyl Cellulose (TAC) for the second lower coating layer 265, which includes a wavelength conversion material (WC), is wound in a third winding roll 303 arranged at the other side of the first winding roll 301, for example, below the first winding roll 301. The Triacetyl Cellulose (TAC) (for the second lower coating layer 265), which includes the wavelength conversion material (WC), is guided to the lower surface of the second polarizing layer 261 by the plurality of guide rollers 400, whereby the second lower coating layer 265 is formed. At this time, surface treatment is performed for the upper surface of the Triacetyl Cellulose (TAC) for the second lower coating layer 265, which includes the wavelength conversion material (WC), whereby an adhesive force between the second lower coating layer 265 and the second polarizing layer 261 may be improved. The surface treatment may be performed by sodium hydroxide (NaOH) treatment and water washing treatment.

A film for the second protection layer 267 is wound in a fourth winding roll 304 arranged below the second lower coating layer 265 guided to the lower surface of the second polarizing layer 261. The film for the second protection layer 267 is guided to the lower surface of the second lower coating layer 265 by the guide rollers 400, whereby the second protection layer 267 is formed.

An adhesive layer coating unit 500 is arranged above the second upper coating layer 263 guided to the upper surface of the second polarizing layer 261, whereby the second adhesive layer 269 is formed on the second upper coating layer 263 by using the adhesive layer coating unit 500.

Also, a fifth winding roll 305 is arranged above the second upper coating layer 263 guided to the upper surface of the second polarizing layer 261, and a release film 270 is wound in the fifth winding roll 305. The release film 270 is guided to the upper surface of the second adhesive layer 269 by the guide rollers 400. The release film 270 is attached to the upper surface of the second adhesive layer 269 and then stripped or removed from the upper surface of the second adhesive layer 269 when the lower polarizer is later attached to the lower surface of the lower substrate.

Meanwhile, although not shown, after the release film 270 is formed, a process of cutting the lower polarizer composed of the second polarizing layer 261, the second upper coating layer 263, the second lower coating layer 265 having the wavelength conversion material (WC), the second protection layer 267, the second adhesive layer 269 and the release film 270 is additionally performed.

Figure 6:
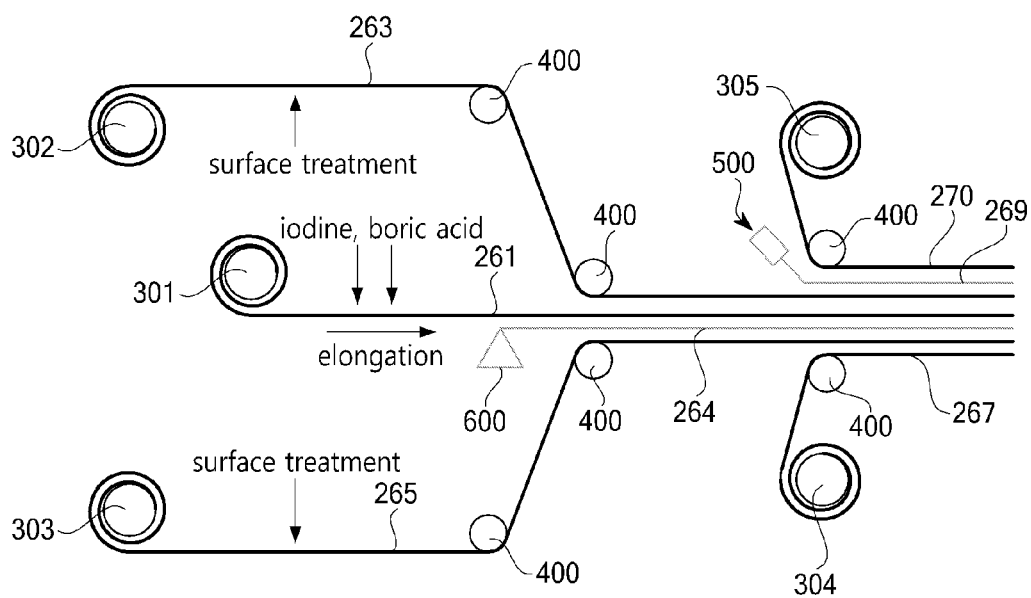
FIG. 6 is a schematic view illustrating a manufacturing process of a lower polarizer according to another embodiment of the present invention.

FIG. 6 is a schematic view illustrating a manufacturing process of a lower polarizer according to another embodiment of the present invention, and relates to a manufacturing process of the aforementioned lower polarizer shown in FIG. 3 or 4. The repeated description of the same elements as those of the aforementioned embodiment(s) will be omitted or minimized.

As shown in FIG. 6, the second polarizing layer 261 is formed by exhaustion/reaction of iodine (I) and boric acid (B) and then elongation thereof while the polyvinyl alcohol (PV) for the second polarizing layer 261, which is wound in the first winding roll 301, is being unwound.

Triacetyl Cellulose (TAC) for the second upper coating layer 263, which is wound in the second winding roll 302, is guided to the upper surface of the second polarizing layer 261 by a plurality of guide rollers 400, whereby the second upper coating layer 263 is formed.

A wavelength conversion layer coating unit 600 is arranged below the first winding roll 301, whereby the wavelength conversion layer 264 (of FIGS. 3 and 4) is formed below the second polarizing layer 261 by using the wavelength conversion layer coating unit 500.

Triacetyl Cellulose (TAC) for the second lower coating layer 265 may be wound in a third winding roll 303. In this case, the lower polarizer shown in FIG. 3 is finally obtained where the wavelength conversion material (WC) is included only in the wavelength conversion layer 264, and is not included in the second lower coating layer 265.

On the other hand, to form the lower polarizer of FIG. 4, the Triacetyl Cellulose (TAC) (for the second lower coating layer 265), which includes the wavelength conversion material (WC), may be wound in the third winding roll 303. In this case, the lower polarizer shown in FIG. 4 is finally obtained, where wavelength conversion materials (WCs) are included in both the wavelength conversion layer 264 and the second lower coating layer 265.

The Triacetyl Cellulose (TAC) for the second lower coating layer 265 (FIG. 3) or the Triacetyl Cellulose (TAC) that includes the wavelength conversion material (WC) (FIG. 4) is guided to the lower surface of the wavelength conversion layer 264 by the plurality of guide rollers 400, whereby the second lower coating layer 265 is formed.

The film for the second protection layer 267 wound in the fourth winding roll 304 is guided to the lower surface of the second lower coating layer 265 by the guide rollers 400, whereby the second protection layer 267 is formed.

The second adhesive layer 269 is formed on the second upper coating layer 263 by using the adhesive layer coating unit 500. Also, the release film 270 wound in the fifth winding roll 305 is guided to the upper surface of the second adhesive layer 269 by the guide rollers 400.

The liquid crystal display device according to one or more embodiments of the present invention may be manufactured by process steps of manufacturing the lower polarizer 260 according to the aforementioned process of FIG. 5 or 6, forming the liquid crystal panel 200 by attaching the lower polarizer 260 to the lower surface of the bonding substrate, e.g., the lower surface of the lower substrate 220, and coupling the liquid crystal panel 200 with the backlight unit 100. Each of these process steps may be performed using various manufacturing methods known in the art.

According to the embodiments of the present invention described as above, the following advantages may be obtained.

According to one or more embodiments of the present invention, since the lower polarizer includes the wavelength conversion material(s), light of the blue wavelength range may partially be converted to light of the green wavelength range or the red wavelength range by the wavelength conversion material(s), whereby light intensity can be generated uniformly at the entire wavelength band and thus the light efficiency of the display device can be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A liquid crystal display device comprising:
 a backlight unit; and
 a liquid crystal panel having an upper polarizer, a liquid crystal layer, and a lower polarizer arranged on the backlight unit,
 wherein the lower polarizer includes:
  a polarizing layer having a light axis for polarized light, and
  a first wavelength conversion material provided between the polarizing layer and the backlight unit, and configured to convert a wavelength of a received light to a different wavelength, and
 wherein the lower polarizer further includes:
  an upper coating layer on an upper surface of the polarizing layer,
  an adhesive layer on an upper surface of the upper coating layer,
  a lower coating layer on a lower surface of the polarizing layer, and
  a protection layer on a lower surface of the lower coating layer.
2. The liquid crystal display device of claim 1, wherein the first wavelength conversion material is included in the lower coating layer.
3. The liquid crystal display device of claim 1, further comprising:
 a wavelength conversion layer provided between the polarizing layer and the lower coating layer,
 wherein the first wavelength conversion material is included in the wavelength conversion layer.

4. The liquid crystal display device of claim 3, wherein a second wavelength conversion material is further included in the lower coating layer.

5. The liquid crystal display device of claim 4, wherein the first and second wavelength conversion materials are the same.

6. The liquid crystal display device of claim 4, wherein each of the first and second wavelength conversion materials is:
  (i) a material for converting a light of a blue wavelength range to a light of a green wavelength range,
  (ii) a material for converting a light of a blue wavelength range to a light of a red wavelength range, or
  (iii) a mixture of the materials (i) and (ii).

7. The liquid crystal display device of claim 1, wherein the backlight unit emits a blue light or white light, and the first wavelength conversion material includes a material for converting a light of a blue wavelength into a light of a green or red wavelength.

8. A polarizer comprising:
  a polarizing layer having a light axis for polarized light;
  a wavelength conversion material for converting a wavelength of a received light to a different wavelength, before the received light that has passed through the wavelength conversion material enters the polarizing layer;
  an upper coating layer on an upper surface of the polarizing layer;
  an adhesive layer on an upper surface of the upper coating layer;
  a lower coating layer on a lower surface of the polarizing layer; and
  a protection layer on a lower surface of the lower coating layer.

9. The polarizer of claim 8,
wherein the wavelength conversion material is included in the lower coating layer.

10. The polarizer of claim 8, further comprising:
  a wavelength conversion layer provided between the polarizing layer and the lower coating layer, wherein the wavelength conversion material is included in the wavelength conversion layer.

11. The polarizer of claim 10, wherein the lower coating layer further includes a wavelength conversion material which is the same as or different from the wavelength conversion material included in the wavelength conversion layer.

12. The polarizer of claim 8, wherein the wavelength conversion material includes a material for converting a light of a blue wavelength into a light of a green or red wavelength.

13. The polarizer of claim 8, wherein the polarizer is a lower polarizer disposed below a liquid crystal layer of a liquid crystal display device, and the wavelength conversion material receives the light from a backlight unit of the liquid crystal display device.

* * * * *